April 23, 1940.   O. H. BANKER   2,198,072
CHANGE SPEED TRANSMISSION MECHANISM
Filed May 31, 1934   2 Sheets-Sheet 1

INVENTOR
Oscar H. Banker
BY
Quarles & French
ATTORNEYS

Patented Apr. 23, 1940

2,198,072

UNITED STATES PATENT OFFICE 2,198,072

CHANGE SPEED TRANSMISSION MECHANISM

Oscar H. Banker, Chicago, Ill., assignor to New Products Corporation, Chicago, Ill., a corporation of Delaware Application May 31, 1934, Serial No. 728,247

31 Claims. (Cl. 74—260)

The invention relates to change speed transmission mechanism.

One of the objects of the present invention is to provide an automatic two speed transmission device in which the driven shaft may be driven at the same speed as the drive shaft or at a higher speed and in which there is no free wheeling action of the parts when the device is in either of its driving relations.

A further object of the invention is to provide a device of the character described in which the gearing moves as a unit with the drive and driven shafts when said shafts are turning at the same speed so that the gearing is not generating heat under these conditions.

A further object of the invention is to provide a change speed gearing of the type above described in which the gearing may be manually released from its high speed engagement.

The invention further consists in the several features hereinafter set forth and more particularly defined by claims at the conclusion hereof.

In the drawings—

Figure 1:
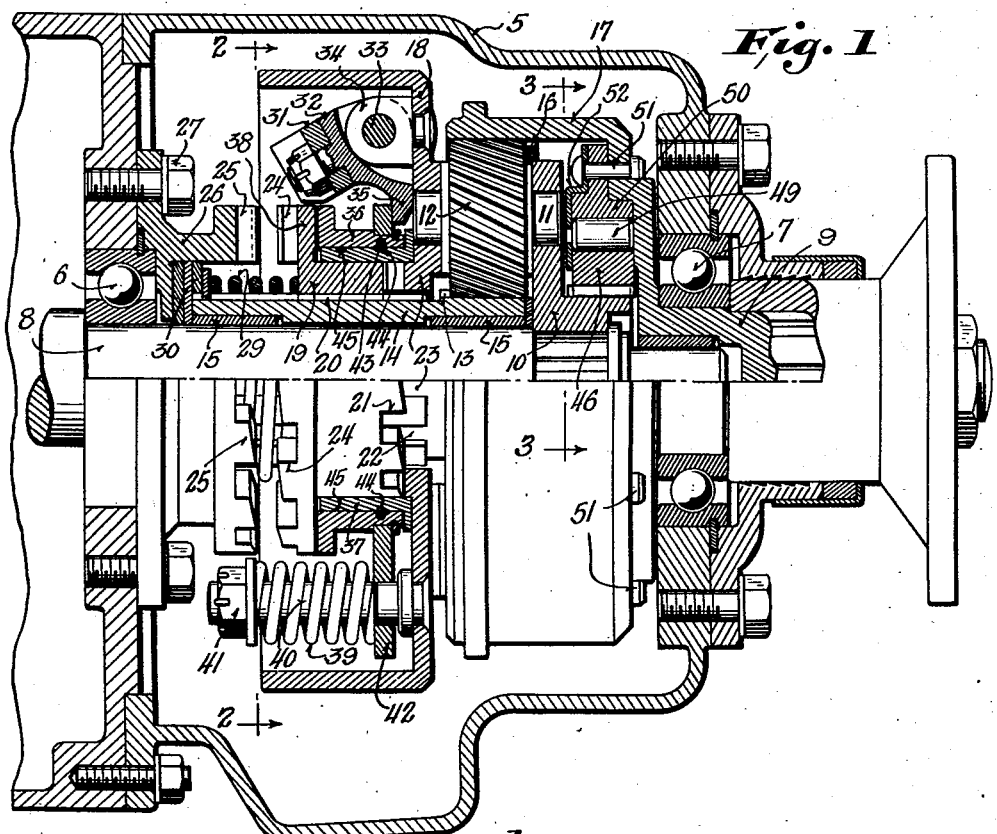
Fig. 1 is sectional view taken along the broken line 1—1 of Fig. 2.
Figure 2:
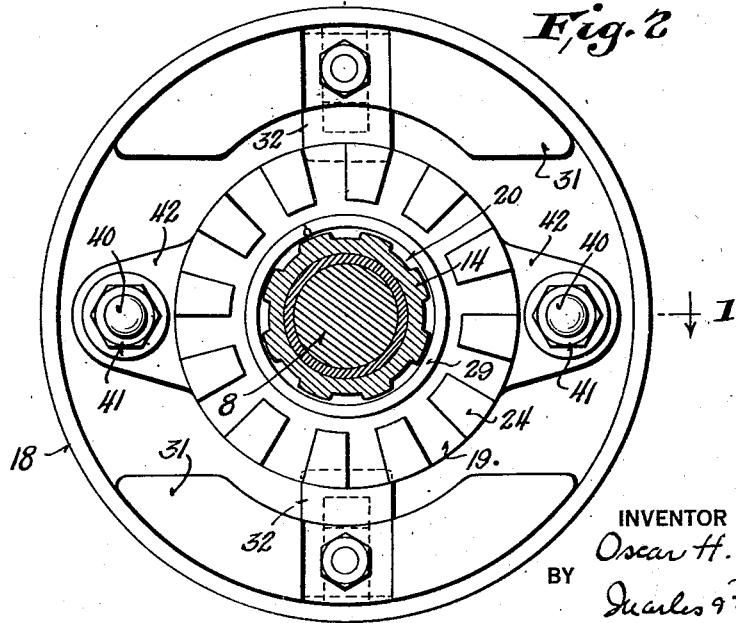
Fig. 2 is a detail sectional view taken on the line 2—2 of Fig. 1 with the weights in extended position.
Figure 3:
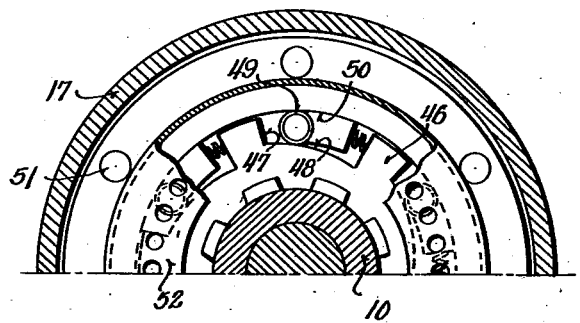
Fig. 3 is a detail sectional view taken on the line 3—3 of Fig. 1.

In the drawings the numeral 5 designates a housing structure having ball bearing journals 6 and 7 therein, and 8 and 9 alined drive and driven shafts respectively mounted in said journals.

The shaft 8 has a planet carrier part 10 keyed to it and forming a spider carrying the pinion shafts 11 having the planet pinions 12 mounted thereon. The pinions 12 mesh with a sun gear 13, whose hub 14 is mounted on bearing bushings 15 on the shaft 8, and mesh with an orbit gear 16 formed integral with or secured to the flange portion 17 of the driven shaft 9.

Another part 18 of the planet carrier is in the form of a drum which is free to revolve about the hub of the sun gear 14.

A speed responsive controlled clutch member 19 is adapted to hold the sun gear so as to revolve with both of said shafts or to hold said gear against rotation. This clutch member 19 is slidably splined at 20 to the hub 14 of the gear 13 and has jaw clutch teeth 21 adapted to engage with similar mating teeth 22 on the hub 23 of the drum 18. This jaw clutch is of the overrunning type. The member 19 also has jaw clutch teeth 24 adapted to engage with similar mating teeth 25 or 25' on a relatively fixed member. This last described jaw clutch is also of the overrunning type. In Fig. 1 the member 26 carrying the teeth 25 is secured by bolts 27 to the housing 5 while in Fig. 4 the member 26' carrying the teeth 25' is slidably keyed to a fixed member 28 secured by bolts 27' to the housing 5.

A coiled spring 29 interposed between thrust washers 30 and the clutch member 19 normally urges it to a position in which its teeth 21 engage with the teeth 22. The member 29 is shifted against the action of said spring by means of governor weights 31 which are bolted to one of the arms of levers 32 pivoted at 33 to brackets 34 secured to the drum 18. The other arms 35 of said levers are adapted to engage the back of a shift collar 36 slidably mounted on a collar or ring 37 fixed to the part 18 of the planet carrier and adapted to have its front end engage the plain face 38 of the member 19. Movement of the weights to an expanded position is normally opposed by springs 39 mounted on rods 40 carried by the drum 18 and interposed between adjustable tension nuts 41 and lugs 42 formed on the collar 36. For holding the governor weights in either contracted or expanded condition to prevent hunting detent mechanism is provided in the form of a split ring spring 43 carried by the collar 36 and adapted to offer resistance to its shifting movement when said spring engages, in contracted position, in the annular recess 44 in the collar 37 to hold the governor in contracted position and when said spring engages, in expanded position, in the annular recess 45 in the collar 37 to hold the governor in expanded position.

Figure 4:
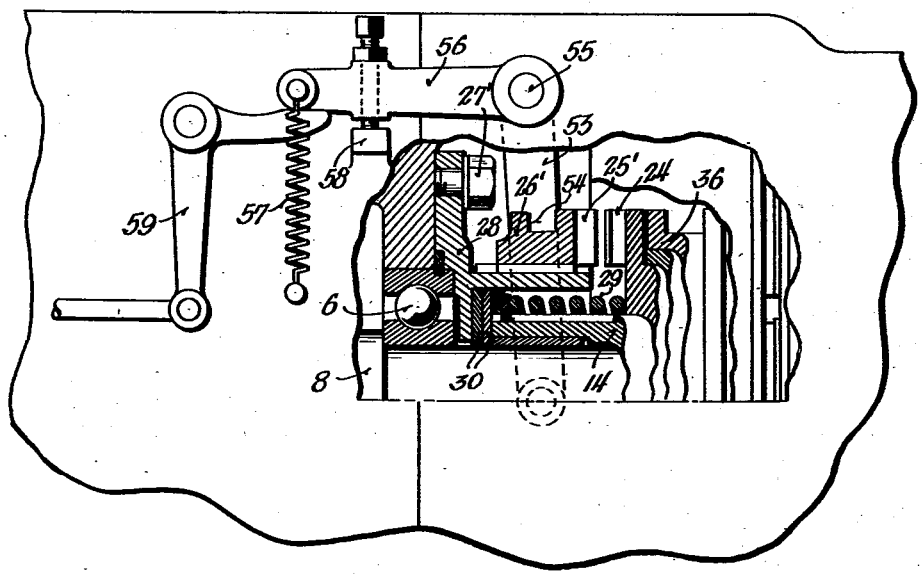
Fig. 4 is a detail view, with parts shown in section showing certain modifications.

A one way or overrunning clutch is also provided between the drive and driven shafts which includes an actuator 46 keyed to the hub of the part 10 of the planet carrier and hence secured to rotate with the drive shaft, and having the notches 47 therein with inclined sides 48 engaged by the spring pressed rollers 49 which under certain conditions are moved to engage the clutch drum 50 here shown as secured to the driven shaft by the rivets 51 which also secure the roller retaining ring 52 in operative position.

Where the member 26' is adapted to be shifted manually I have shown in Fig. 4 a shift lever 53 having the usual forks engaging in the groove 54 in said member and carried by a shaft 55 which has an exteriorly disposed operating arm 56. The arm 56 is normally urged by a spring 57 against a stop 58 and is adapted to be swung upwardly to swing the lever 53 and hence the member 26' to the left to a release position by a manually operated lever 59.

With the above described construction when the clutch member 19 is engaged with the drum 18, as shown in Fig. 1, the gear 13 is locked to the planetary carrier and consequently the pinions 12 are locked to said gear so that these parts revolve as a unit with the drive shaft 8 through the keyed connection of said shaft with said carrier and at the same time the orbit gear 16 is locked to revolve as a unit with said pinions so that the driven shaft 9 including the flange portion 17 is also driven direct with the drive shaft. When under these conditions the speed of the driven shaft increases to about forty to forty-five miles per hour, the governor weights 31 under the action of centrifugal force move outwardly and thus act to shift the clutch member 19 out of engagement with the driver 18 and bring its teeth 24 into position for engagement with the teeth 25 or 25'. When the speed for shifting is reached and the operator is still accelerating or the motor is driving the car, due to torque on the clutch jaws, the shifting will not take place until the operator releases the accelerator on purpose or accidentally. Under these conditions a temporary deceleration of the drive shaft 8, as by the closing of the throttle, will through the gearing cause the slowing down and reversing of the gear 13 and hence the clutch member 19 until it may be moved through the action of the weights into clutched engagement with the relatively stationary member 26 or 26'. If the operator fails to decelerate the speed of the drive shaft 8 sufficiently or for a sufficient time interval for the clutch member 19 to become engaged with the relatively stationary members and steps on the gas to accelerate, the overrunning clutch including the drum 50, which is arranged between the driving and driven shafts and so constructed that the drive shaft will drive the driven shaft through it, will take up the drive. As soon, however, as the clutch member 19 is engaged as above described and thus prevented from rotating the gear 13 becomes stationary and then the drive proceeds from the drive shaft 8 through the planetary carrier to the pinions 12 which then rotate about said sun gear and also rotate said orbit gear 16 and hence the driven shaft 9 at a higher speed than that of the drive shaft.

If under the conditions of high gear ratio drive it is desired to immediately proceed in the lower speed, then the manual release shown in Fig. 4 may be used to move the clutch member 26' toward the left out of engagement with the clutch member 19, and under these conditions the drive is taken through the overrunning clutch 46, 49, 50 until the governor brings the member 19 back into position to engage the teeth 23.

Also when the speed decreases to a point that the governor weights 31 will be released from their expanded condition, for example 30 miles per hour, the clutch member 19 will then be released automatically by the spring 29 and moved back into engagement with the drum 18, the clutch teeth 21 and 22 engaging when the parts are synchronized.

From the foregoing description it will be noted that the gearing is locked to revolve with the drive and driven shafts at one speed and is automatically engaged at a higher speed, on a temporary reduction in speed of the drive shaft, to drive the driven shaft at a higher speed than that of the drive shaft and that under either of these driving conditions there is no free wheeling action.

It is to be noted that the shafts are rotating at the same speeds in lower ratio or speed and that the driven shaft is rotated at a higher gear ratio or speed when connected to the drive shaft through the gear. This mechanism may be located back of the usual multi-speed transmission mechanism of the vehicle so that no special locks are necessary when in reverse.

I desire it to be understood that this invention is not to be limited to any particular form or arrangement of parts except in so far as such limitations are included in the claims.

What I claim as my invention is:

1. In a change speed gearing, the combination of a drive shaft, a driven shaft, change speed planetary gearing between said shafts including a sun gear, an orbit gear connected to the driven shaft, a planetary carrier and its pinion meshing with said sun and orbit gears, and speed responsive controlled means for connecting said sun gear to revolve with said carrier or to hold it from rotation therewith.

2. In a change speed gearing, the combination of a drive shaft, a driven shaft, change speed planetary gearing between said shafts including a sun gear, an orbit gear connected to the driven shaft, a planetary carrier and its pinion meshing with said sun and orbit gears, shiftable clutch means for connecting said sun gear to revolve with said carrier or hold it from rotation therewith, and speed responsive means controlling said clutch means.

3. In a change speed gearing, the combination of a drive shaft, a driven shaft, change speed planetary gearing between said shafts including a sun gear, an orbit gear connected to the driven shaft, a planetary carrier directly driven by said drive shaft and having a pinion meshing with said sun and orbit gears, a shiftable clutch member mounted to turn with said sun gear, a jaw clutch connection between said clutch member and said carrier for revolving said sun gear with said carrier, a jaw clutch connection between said clutch member and a relatively stationary part to hold said sun gear against rotation, and speed responsive means controlling said clutch member.

4. In a change speed gearing, the combination of a drive shaft, a driven shaft, change speed planetary gearing between said shafts including a sun gear, an orbit gear connected to the driven shaft, a planetary carrier directly driven by said drive shaft and having a pinion meshing with said sun and orbit gears, a free-wheeling clutch between said drive and driven shafts, shiftable clutch means for connecting said sun gear to revolve with said carrier or hold it from rotation therewith, and speed responsive means controlling said clutch means.

5. In a change speed gearing, the combination of a drive shaft, an alined driven shaft, change speed planetary gearing between said shafts including a sun gear free to revolve about said drive shaft, an orbit gear connected to said driven shaft, a planetary carrier directly driven by said drive shaft and having a pinion meshing with said sun and orbit gears, a shiftable clutch member mounted to turn with said sun gear for connecting said sun gear to revolve with said carrier or hold it from rotation therewith, and governor weights mounted on said carrier and operatively connected to said clutch member.

6. In a change speed gearing, the combination of a drive shaft, a driven shaft, change speed planetary gearing between said shafts including a sun gear, an orbit gear connected to said driven shaft, a planetary carrier and its pinion meshing with said sun and orbit gears, shiftable clutch means for connecting said sun gear to revolve with said carrier or hold it from rotation therewith, speed responsive means controlling said clutch means, and manually operable means to release said clutch means when in its holding position.

7. In a change speed gearing, the combination of a drive shaft, a driven shaft, change speed planetary gearing between said shafts including a sun gear, an orbit gear connected to the driven shaft, a planetary carrier and its pinion meshing with said sun and orbit gears, jaw clutch mechanism of the overrunning type for connecting said sun gear to revolve with said carrier or to hold it from rotation therewith, and speed responsive means controlling said clutch mechanism.

8. In a change speed gearing, the combination of a drive shaft, a driven shaft, change speed planetary gearing between said shafts including a sun gear, an orbit gear connected to the driven shaft, a planetary carrier directly driven by said drive shaft and having a pinion meshing with said sun and orbit gears, a free-wheeling clutch between said drive and driven shafts, and speed responsive controlled positive jaw clutch mechanism for connecting said sun gear to said gearing for direct drive of said shafts or for holding said sun gear stationary for drive through said gearing and preventing the operation of said free-wheeling clutch.

9. In a change speed gearing, the combination of a drive shaft, a driven shaft, change speed planetary gearing between said shafts including a sun gear, an orbit gear connected to the driven shaft, a planetary carrier and its pinion meshing with said sun and orbit gears, and speed responsive controlled clutch mechanism, operable on a temporary reduction in speed of the drive shaft, to connect said sun gear to revolve with said carrier.

10. In a change speed gearing, the combination of a drive shaft, a driven shaft, change speed planetary gearing between said shafts including a sun gear, an orbit gear connected to the driven shaft, a planetary gear carrier connected to said drive shaft and having a pinion meshing with said sun and orbit gears, and clutch mechanism operable on a temporary reduction in speed of the drive shaft, to connect said sun gear to revolve with said carrier or to hold it stationary.

11. In a change speed gearing, the combination of a drive shaft, a driven shaft, change speed planetary gearing between said shafts including a sun gear, an orbit gear connected to the driven shaft, a planetary carrier connected to said drive shaft and having a pinion meshing with said sun and orbit gears, a shiftable clutch member mounted to turn with said sun gear, an overrunning jaw clutch connection between said clutch member and said carrier for revolving said sun gear with said carrier, and an overrunning jaw clutch connection between said clutch member and a relatively stationary part to hold said sun gear against rotation, the last named of said clutch connections being operable to effect engagement on a temporary reduction in speed of said drive shaft.

12. In a change speed gearing, the combination of a drive shaft, a driven shaft, change speed planetary gearing between said shafts including a sun gear, an orbit gear connected to the driven shaft, a planetary carrier connected to said drive shaft and having a pinion meshing with said sun and orbit gears, means for holding said sun gear against rotation, means for connecting said sun gear to revolve with said carrier, and an overrunning clutch between said drive and driven shafts permitting a unidirectional drive of said driven shaft independent of said gearing.

13. In a change speed gearing, the combination of a drive shaft, a driven shaft, change speed planetary gearing between said shafts including a sun gear, an orbit gear connected to said driven shaft, a planetary carrier and its pinion meshing with said sun and orbit gears, shiftable jaw clutch mechanism for connecting said sun gear either to revolve with said orbit gear or to be held stationary, speed responsive means controlling said clutch mechanism, the jaw of said stationary clutch mechanism being manually shiftable to release said sun gear.

14. In a change speed planetary transmission, the combination of a drive shaft, a driven shaft, a planetary gearing unit between said shafts including a reaction member, an orbit gear, a planet gear, and a planetary gear carrier, an overrunning type multiple face jaw clutch adapted in one position to lock the planet gear as a unit with said reaction member and orbit gear and in another position to lock the reaction member of the gearing stationary, and controlling means for said jaw clutch.

15. In a change speed planetary transmission, the combination of a drive shaft, a driven shaft, a planetary gearing unit between said shafts including a sun gear, an orbit gear, a planet gear, and a planetary gear carrier, an overrunning type multiple face jaw clutch adapted in one position to lock the planet gear as a unit with said sun and orbit gears and in another position to lock the sun gear stationary, and controlling means for said jaw clutch.

16. In an automatic change speed transmission, the combination of a drive shaft, a driven shaft, variable change speed transmission gearing between said shafts, speed responsive means for changing the speed ratio of said gearing including centrifugally operable weights, sleeves operatively connected to said weights, springs opposing the movement of said sleeves, means for locking one of said sleeves in the expanded or contracted position of said weights, and clutch mechanism controlled by said sleeves and controlling said gearing.

17. In a change speed planetary transmission, the combination of a drive shaft, a driven shaft, a planetary gearing unit between said shafts including a sun gear, an orbit gear, a planet gear, and a planetary gear carrier, overrunning jaw clutch mechanism having an element connected with said carrier and a stationary element, and a shiftable jaw clutch element adapted to revolve with said sun gear and having a clutch face adapted in one position to engage the first named element to connect the planet gear as a unit with said sun and orbit gears and having a clutch face adapted in another position to engage said stationary element and lock said sun gear stationary.

18. In a change speed gearing, the combination of a drive shaft, a driven shaft, change speed planetary gearing between said shafts including a sun gear, an orbit gear connected to the driven shaft, a planetary gear carrier connected to said drive shaft and having a pinion meshing with said sun and orbit gears, overrunning clutch mechanism to connect said sun gear to revolve with said carrier, and an overrunning clutch, operable on a temporary reduction in speed of the drive shaft, to hold said sun gear stationary.

19. In a change speed gearing, the combination of a drive shaft, a driven shaft, change speed planetary gear between said shafts including a sun gear, an orbit gear connected to the driven shaft, a planetary gear carrier connected to said drive shaft and having a planet gear meshing with said sun and orbit gears, and overrunning positive jaw clutch mechanism to connect said sun gear to revolve with said carrier or to hold it stationary.

20. In a transmission, the combination with a driving shaft and a driven shaft, of a transmission gearing for driving said driven shaft at a greater speed than the driving shaft, a clutch for establishing driving relation between said driving and driven shafts through said gearing, one of the members of said clutch being axially movable into engaging position and centrifugally operated means operated from the driving shaft for moving said clutch member axially.

21. In a change speed over-drive gearing, in combination, a drive member, a driven member, change speed planetary gearing between said members including a reaction element, a driven gear element connected to the driven member, a drive element connected to the drive member, and planetary pinions intermediate said drive and driven elements, shiftable clutch means for connecting said reaction element to revolve with said drive element or to hold it stationary, speed responsive means controlling said clutch means, and a free-wheeling clutch between said drive and driven members forming a driving connection therebetween when the shiftable clutch means is disengaged.

22. In a change speed over-drive gearing, in combination, a drive member, a driven member, change speed planetary gearing between said members including a reaction gear element, a driven gear element connected to said driven member, a drive element connected to said drive member, and planetary pinions intermediate said drive and driven gear elements, shiftable clutch means for connecting said reaction gear element to revolve with the drive element or to hold it stationary, speed responsive means controlling said clutch means, and manually operable means to release said clutch means when in its holding position.

23. In a change speed over-drive gearing, in combination, a drive member, a driven member, change speed planetary gearing between said members including a reaction gear element, a driven gear element connected to said driven member, a drive element connected to said drive member, and planetary pinions intermediate said drive and driven gear elements, shiftable clutch means for connecting said reaction gear element to revolve with the drive element or to hold it stationary, speed responsive means controlling said clutch means, and manually operable means to release said clutch means when in its holding position, and a free-wheeling clutch between said drive and driven members effective to establish a driving connection therebetween when said clutch means is released.

24. In a change speed over-drive gearing, in combination, a drive member, a driven member, change speed planetary gearing between said members including a reaction gear element, a driven gear element connected to the driven member, a drive element connected to the drive member, and a planetary pinion intermediate said drive and driven elements, a free-wheeling clutch between the drive and driven members, and speed responsive controlled positive jaw clutch mechanism for connecting said reaction gear element to said drive element for direct drive of said members or for holding said reaction gear element stationary for drive through said planetary gearing and preventing the operation of said free-wheeling clutch.

25. Transmission mechanism comprising, a driving member, a driven member, a clutch connecting said members for rotation at the same speed, resilient means under stress maintaining engagement of said clutch, a speed responsive means on the driving member for controlling said resilient means at a predetermined rise in speed and thereby disengaging said clutch, speed increasing gearing for connecting said members independently of the clutch upon disengagement thereof, and means for connecting said members through said gearing.

26. Transmission mechanism comprising, a driving member, a driven member, a clutch connecting said members for rotation at the same speed, resilient means on the driving member holding said clutch in the engaged position, a speed responsive means on the driving member for overcoming said resilient means at a predetermined rise in speed thereby disengaging said clutch, speed increasing gearing for connecting said members independently of the clutch upon disengagement thereof, and means for connecting said members through said gearing.

27. In a change speed over-drive planetary transmission gearing, in combination, a drive member, a driven member, change speed planetary gearing between said members including a reaction element, a driven gear element connected to the driven member, a driving element connected to the drive member and planetary pinions, means for causing said reaction element to revolve with said driven gear element or to hold it stationary, and speed responsive means operable to control said last mentioned means either to cause said reaction element to revolve with said driven gear element or to hold the reaction element stationary.

28. In a change speed over-drive gear, in combination, a drive member, a driven member, change speed planetary gearing between said members including a reaction gear element, a driven gear element connected to the driven member, a drive element connected to the drive member and a planetary pinion, clutch mechanism operable upon a temporary reduction in speed of the drive member relative to the driven member to connect said reaction element to revolve with said drive element or to hold it stationary and means effective automatically upon such temporary reduction in speed of the drive shaft to shift such clutch mechanism from one operative position to the other.

29. In a vehicle drive, power driving means, means driven by said power driving means and adapted to drive the vehicle, driving means including planetary gearing intermediate said power driving means and driven means for driving said driven means at a speed different than that of said power driving means, clutch means including clutching parts for positive clutching engagement in one position for effecting the drive of said driven means through said intermediate driving means, and in another position for positive clutching engagement for effecting bi-directional drive of said driven means at the same speed as said power driving means, and automatically controlled means for effecting shift of said clutch means into its bi-directional direct drive position.

30. In a vehicle drive, power driving means, means driven by said power driving means and adapted to drive the vehicle, over-driving means including planetary gearing intermediate said power driving means and said driving means for driving said driven means at a speed greater than that of said power driving means, clutch means including clutching parts adapted for positive clutching engagement in one position for effecting the drive of said driven means through said intermediate driving means, in a second position for positive clutching engagement for effecting bi-directional drive of said driven means at the same speed as said power driving means, and in a third position to be disengaged, manual means under the control of the operator to disengage certain of said clutch parts at will, a free-wheeling clutch device intermediate said power driving means and said driven means forming a driving connection therebetween when said clutch parts are disengaged, and automatically controlled means for effecting shift of the clutching parts into bi-directional direct drive position.

31. In a vehicle drive, power driving means, means driven by said power driving means and adapted to drive the vehicle, over driving means including planetary gearing intermediate said power driving means and said driven means for driving said driven means at a speed greater than that of said driving means, and a clutch including clutching parts adapted for positive clutching engagement in one position for effecting the drive of said driven means through said intermediate driving means, and in another position for positive clutching engagement for effecting the bi-directional drive of said driven means at the same speed as said power driving means, a free-wheeling clutch device intermediate said power driving means and said driven means forming a uni-directional driving connection therebetween when said clutch is disengaged and automatically controlled means for effecting shift of the clutching parts into bi-directional direct drive position.

OSCAR H. BANKER.